United States Patent [19]

Flimon

[11] 3,911,960

[45] Oct. 14, 1975

[54] END-PIECE FOR TUBULAR ELEMENTS

[75] Inventor: Jacques Flimon, Saint Mande, France

[73] Assignee: Flimon Industrie S.A., Montreuil, France

[22] Filed: June 4, 1973

[21] Appl. No.: 366,353

[52] U.S. Cl. ............................... 138/96 R; 220/73
[51] Int. Cl.² .......................................... B65D 59/00
[58] Field of Search .......... 138/89, 96 R, 96 T, 109, 138/110; 220/73

[56] References Cited
UNITED STATES PATENTS

| | | | |
|---|---|---|---|
| 1,498,563 | 6/1924 | Morrison et al. | 138/96 |
| 1,853,946 | 4/1932 | Unke | 138/96 |
| 2,073,584 | 3/1937 | Osborn | 138/96 |
| 2,121,436 | 6/1938 | Lytle | 138/96 |
| 2,196,454 | 4/1970 | Kahn et al. | 138/96 |
| 2,977,993 | 4/1961 | Scherer | 138/96 |
| 3,485,271 | 12/1969 | Halsey | 138/96 |
| 3,490,488 | 1/1970 | Grist | 138/89 |
| 3,496,964 | 2/1970 | Thomas et al. | 138/109 |
| 3,744,528 | 7/1973 | Vestal | 138/96 |

FOREIGN PATENTS OR APPLICATIONS 672,432   10/1963   Canada ................................ 138/96

*Primary Examiner*—Herbert Goldstein
*Attorney, Agent, or Firm*—Young & Thompson

[57] ABSTRACT

The invention relates to an end-piece for protecting the chamfered terminal sections of tubular elements such as pipes or tubes, against damage during handling and installation or against climatic conditions, said end-piece comprising a peripheral skirt surrounding the extremity of the lateral wall of a said tubular element, a flange extending towards the axis of said tubular element, and an over-thickness serving as an annular stiffening means, interposed in the angular coupling zone between said skirt and said flange, so as to stop at that level any accidental tearing of the flange. The flange may be flat or may terminate in an oblique lip directed inwards, and previously-weakened zones permit either a controlled degree of tearing or elastic deformation. The over-thickness may be strengthned by inserted reinforcing members. The flange may also have the form of a frontal disc adapted to close hermetically the extremity of the tubular element, and small bags of protective products such as dehydrating agents may be housed on the inner wall of the said disc. The peripheral skirt may be given a slight internal conicity so as to give a tight grip on the terminal portion of the tubular element, or the internal face of the skirt may be provided with circular or longitudinal ribs for the same purpose. Alternatively, the outer side of the skirt may be provided with binding hoops for clamping the skirt on the tubular element, and these hoops may be of a material which is retractable under heat.

6 Claims, 27 Drawing Figures

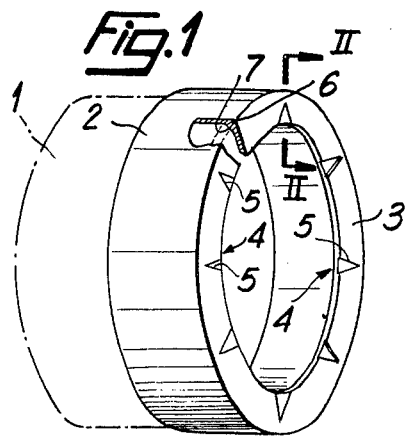
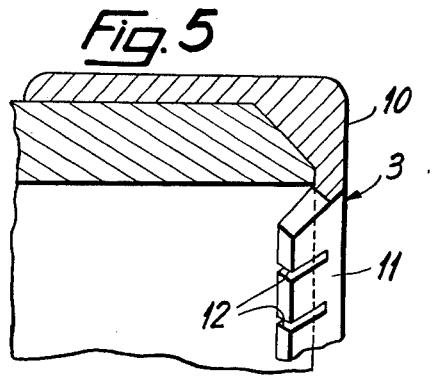
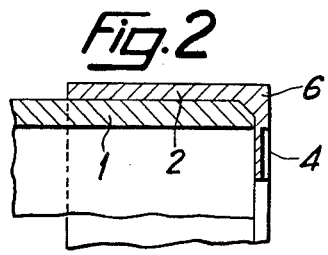
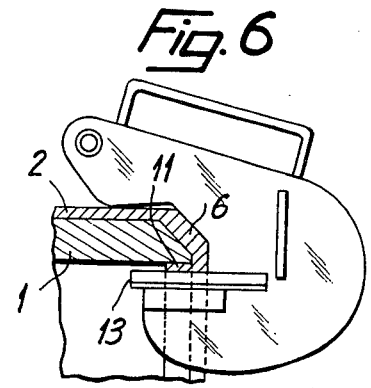
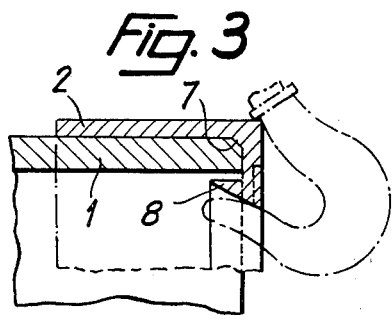
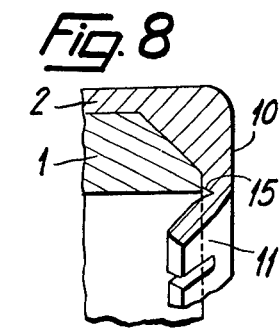
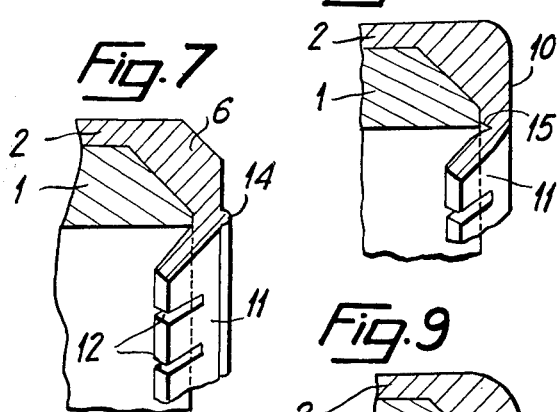
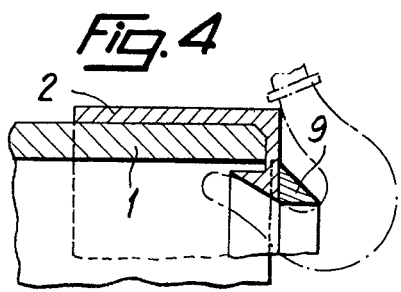
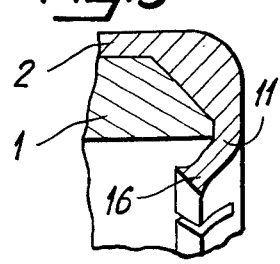

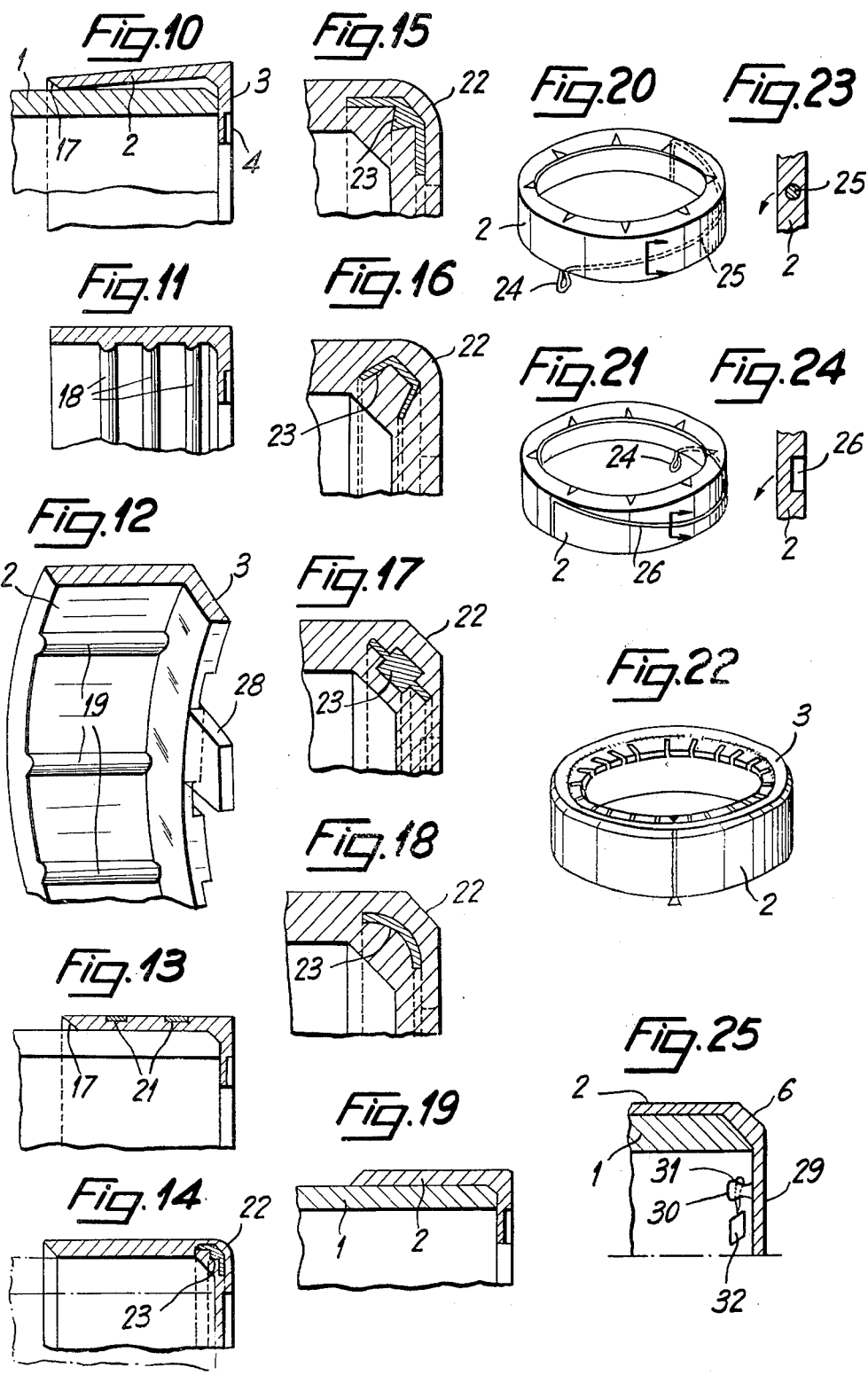

END-PIECE FOR TUBULAR ELEMENTS

Many tubular members employed either for the circulation of fluids or for protecting connection means are provided at their extremities with coupling devices which require protection against shocks and/or external climatic conditions. Certain tubes may additionally comprise internal coatings which should preferably be protected from metallic contacts during handling operations from the output of the manufacturing in line up to the place of use.

This is especially the case with tubes having chamfered extremities (pipe-lines, gas-conveyor tubes, etc.) prepared for coupling by welding. These materials are very frequently assembled in regions difficult of access under extreme climatic conditions, and it will be understood that it is fundamental that the sensitive faces should be protected during their transport, storage and various handling operations to which they are subjected before being placed in their final positions.

Account must in fact be taken of the use of nonspecialized labour, of absence of repair means, so that elements damaged by shock or any phenomenon of oxidation will have to be scrapped or graded-down, while the installation programme may be thereby affected and considerable losses may result. It may also be envisaged to cut-off the ends of damaged tubes, but this results in a substantial loss of the resultant length.

It is already known to protect tubular elements by metal covers or hoods, but this arrangement has serious disadvantages:
Considerable weight having an appreciable effect on freight charges,
The necessity of having elements rigidly adapted to each model in tube dimension;
High cost;
The protection device is itself exposed to oxidation phenomena.

The present invention relates to an end protector for tubular bodies having a chamfered terminal section of the type comprising a cylindrical skirt which passes round the extremity of the lateral wall of the tubular body and a flange extending towards the axis of the said cylindrical skirt.

It will be understood that the skirt assists in the protection of the outer end portion of the tubular body and that, for its part, the associated flange more particularly protects the front section and especially the chamfer, this protection being increasingly effective as the flange extends further towards the axis of the tubular body.

However, this extension towards the axis of the flange projecting from the edge of the tubular body makes it vulnerable to the action of lifting hooks. According to the type of hook employed -catch-hook or plate-hook for example- there is a risk of hooking or crushing, followed by local tearing of the edge of the flange during the removal or the introduction of the hook. This tear may be the origin of a complete tearing-away or local shearing of the end-piece.

It is clear that this risk may be limited by giving the flange a radial dimension which is substantially dependent on the thickness of the body protected. By proceeding in this manner however, two drawbacks are encountered:
a. On the one hand, the protection provided for the chamfer loses some of its reliability;
b. on the other hand, a single end-piece can only be employed for bodies having not only the same external diameter but also the same thickness, while a wider flange permits the limitation of the number of end cuts to be made for the same external diameter, but re-introduces the risk of hooking or crushing.

In view of the importance assumed by the protection of the sensitive surfaces, the chamfer for example, of tubular bodies, it will be understood that it is essential for an incipient fracture to be controlled and especially stopped before the zones which co-operate with these vulnerable surfaces. The invention resolves this problem in a rational manner by means of an end protector for a tubular body having a chamfered end section of the type comprising a cylindrical peripheral skirt which passes round the extremity of the lateral wall of the tubular body and a flange extending towards the axis of the said tubular body, characterized in that the said end-piece is provided in the angular coupling zone between the said skirt and the said flange, with an over-thickness forming an annular stiffening means interposed between the said skirt and the said flange for the purpose of protecting the said skirt from tearing or deformation to which the flange is liable to be subjected during handling operations.

The said over-thickness advantageously comprises an internal profile such that it is adapted to co-operate closely with a chamfer zone of the orifice of the said tube.

This chamfer zone may have a single slope from one edge to the other or on the contrary, it may have a variable slope with a number of facets.

In combination with the said over-thickness and according to a characteristic feature of the invention, the said flange is substantially flat and is provided along its internal circumference with a plurality of previously weakened radial zones, of which the local tear of controlled extent, resulting from a tearing force applied to any point of the said flange, limits to a permissible value the force applied to the said over-thickness, so as to stop at its level any accidental tears.

This arrangement is more particularly directed to the protection of tubular bodies subjected to handling by means of catch-hooks.

In fact, this combination of a profiled over-thickness located in the angular coupling zone between the flange and the skirt of the end-piece with means for weakening the said flange constitutes precisely a neat and economical solution to the problem of protection as defined above.

Indeed, if for any reason a tractive force is applied to the marginal zone inside the flange of the end-piece, a tear will occur along a pre-determined weakened line or zone, this tear being controlled due to the fact that it is stopped level with the over thickness, which is capable of withstanding the tearing force, while the member which has caused the tear escape through the controlled tear. Furthermore however, this over-thickness which prevents a complete tear of the end protector, simultaneously ensures the protection of the chamfer or of any other profiled arrangement at the extremity of the tube. This over-thickness may be moulded integrally or added to a standard basic model, depending on the case.

In the cases in which it is necessary to protect the internal lining (of epoxy resin for example) of a tubular body, the flange of the end-piece according to the invention is provided with an internal peripheral return added to or manufactured integrally with the protection device, made of appropriate material and profile, adapted to protect the internal end portion of the tubular body against accidental contact with the hook of a lifting means.

This internal return may be combined with a circular external heel, added or moulded integrally with the protection device, having an appropriate profile and intended to position the hook of a lifting means in such manner that the nose of the said hook cannot come into contact with the interior surface of the tube. The internal return and also the outer heel may be of metal or of synthetic material formed integrally with or added on the protector body by any known method of assembly.

According to another characteristic feature of the invention, corresponding to the cases of handling by plate-hooks, the said flange is given successively a substantially flat surface followed by an oblique surface directed along a variable angle towards the interior, and comprises, along its internal circumference, a plurality of previously weakened radial zones, such as saw marks, permitting a local elastic deformation of the said flange.

These previously weakened zones give way elastically upon the introduction of the hook and form a screen between the plate and the internal wall of the tubular body, which may possibly be provided with a lining.

Advantageously, the end portion of the said oblique surface may have an over-thickness intended to increase the distance between the plate of a lifting hook and the internal surface of the tubular body, capped by the said end-piece.

In the case of certain tubular bodies, in addition to the protection of the end section, it is required to isolate the internal space of the tubular body from the surrounding medium, by blocking-up the extremities. This double protection is ensured by an alternative form of the invention, characterized in that the said flange is a front disc forming a closure wall for the extremity of the tubular body.

This hermetic isolation generally connotes a control of the volume of air imprisoned, by the addition of protective products, in particular dehydrating agents contained in small bags. To this end, the front disc is provided at any point on its internal surface with an excrescence of appropriate shape having a transverse passage or not, intended to receive a small bag containing protective products, especially dehydrating agents.

According to still another characteristic feature of the invention, the peripheral skirt of the end-piece has a slight conicity so as to ensure a tight fit of the skirt on the periphery of the protected tube.

As a complement of this conicity, the skirt of the end-piece may be provided on its internal face with a plurality of circular beads or varied longitudinal sections which grip the end-piece on the periphery of the tube.

This gripping action may also be obtained, according to the invention, with an end-piece skirt having annular housing means capable of receiving rings which play the part of clamping bands for the said end-piece on the said tubular body; the said rings may be of any metallic or plastic material, in particular of material which contracts under heat, and they are tightened by any known methods.

The end-piece according to the invention may also comprise an external or internal marking zone, permitting easy classification of the tubes by dimensions or by sector of use. This graphic identification may advantageously be completed by identification with colours which avoids any handling for this purpose.

According to another characteristic feature of the invention, the end-piece comprises, in the angular coupling zone between the flange and the peripheral skirt, profiled rings of a material identical with or different from that of the end-piece, these rings being wholly or partly embedded in the over-thickness of the end-piece in the said zone and being provided with projecting portions or transverse passages ensuring their anchorage in the said over-thickness.

These rings may constitute an additional reinforcement against a shearing force or even against crushing of the end-piece by the weight of superposed tubes.

Removal before use is effected by means of a handling arrangement, a ring for example associated with a metal wire embedded in the end-piece along a predetermined tearing line, or alternatively with a small tongue constituting the extremity of a weakened zone of the skirt. In both cases, a pull applied to the releasing ring causes tearing of the skirt sufficiently to enable the end-piece to be removed without difficulty. According to the method of storage employed, this ring may be accessible from the exterior or from the interior of the tube.

The characteristic features and advantages of the invention will furthermore be brought out in the description which follows below, given by way of example with reference to the accompanying drawings, in which:

FIG. 1 is a general view in perspective of an end-piece according to the invention, adapted for handling by means of nose-hooks;

FIG. 2 is a view in cross-section taken along the axis II—II of FIG. 1;

FIG. 3 is a partial section of an end-piece according to FIG. 1, with an internal return;

FIG. 4 is a partial section of an end-piece in accordance with FIG. 1, with an internal return and an external heel;

FIG. 5 is a partial section of an end-piece adapted for handling by plate-hooks;

FIG. 6 is a partial view in cross-section of an end-piece according to FIG. 5, engaged with a lifting-hook of the plate type;

FIG. 7 is a partial view in cross-section of an end-piece according to FIG. 5, provided with an external rib;

FIG. 8 is a partial view in cross-section of an end-piece according to FIG. 5, comprising an internal annular slot;

FIG. 9 is a partial view in cross-section of an end-piece according to FIG. 5, having an over-thickness on the end portion of the oblique lip of the flange;

FIG. 10 is a partial longitudinal section of an end-piece which illustrates the conicity of the device;

FIG. 11 is a partial longitudinal section of an end-piece with circular goffers;

FIG. 12 is a partial longitudinal section in perspective of an end-piece with longitudinal goffers;

FIG. 13 is a partial longitudinal section of an end-piece provided with circular binding-hoops;

FIG. 14 is a partial cross-section of an end-piece with an embedded toric insert;

FIG. 15, 16, 17 and 18 are partial cross-sections of end-pieces with rounded or broken edges comprising toric inserts of various sections;

FIG. 19 is a partial cross-section of an end-piece in which the skirt is formed with an inverse bevel;

FIG. 20 is a view in perspective of an end-piece provided with a tearing wire;

FIG. 21 is a view in perspective of an end-piece equipped with a tearing tongue;

FIG. 22 is a view in perspective of an end-piece according to the form of construction shown in FIG. 5, equipped with a tearing tongue;

FIGS. 23 and 24 are partial sections of the end-pieces shown in FIGS. 20 and 21;

FIG. 25 is a partial view in cross-section of an alternative form of the end-piece according to the invention, provided with a front plate.

Figure 26:
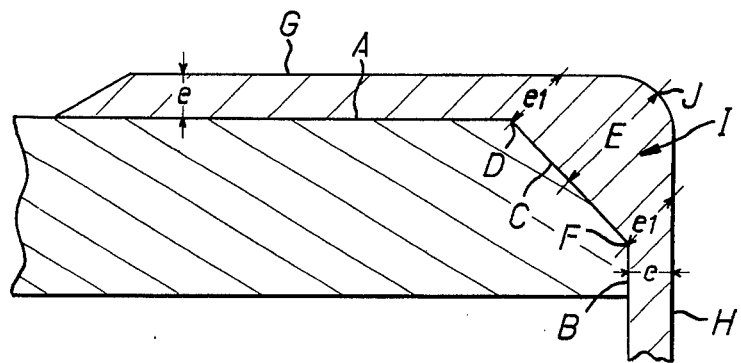
FIG. 26 is a partial section on an enlarged scale of an end-piece illustrating the position of the extra-thickness.
Figure 27:
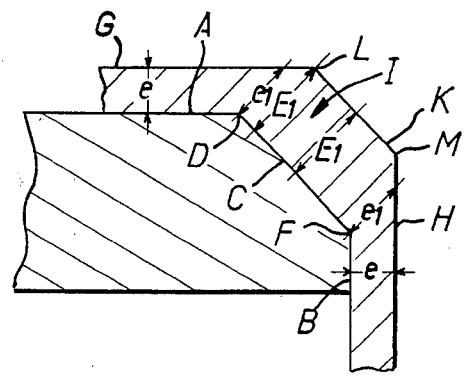
FIG. 27 is a partial section on an enlarged scale similar to FIG. 26 according to an alternative embodiment.

According to the form of embodiment chosen by way of example and shown in FIGS. 1 and 2, the end-piece according to the invention, placed in positions on a tubular body 1, is constituted by a cylindrical skirt 2 associated with a flange 3. In the particular case of handling by means of nose-hooks, the flange 2 is provided, equally distributed along its circumference, starting from its internal edge and stopping at a desired distance from its external edge, with weakened zones 4. These zones may have various shapes and distances apart, such as for example a triangle 5 (FIG. 1) in which the apices are orientated radially towards the exterior.

As can be seen from FIG. 2, the coupling zone between the skirt 2 and the flange 3 is provided with an over-thickness 6 advantageously adapted to the profile of the chamfer 7 of the tubular body covered by the end-piece.

FIGS. 3 and 4 show one extremity of the tube fitted with an end-piece according to FIG. 1 and in engagement with a lifting-hook of the nose type. In particular, if the tube comprises a fragile internal coating, it is important to prevent any contact between the nose of the hook and the internal wall of the tube. This protection is ensured either by a circular return 8 of variable length or by such a return combined with a circular external heel 9. In the first case, it is the side of the return which is engaged by the nose of the hook; if a slip of this nose towards the interior of the tube and therefore towards the coated wall is to be feared, the heel 9 is provided additionally, which, being placed between the shank and the nose, prevents its lateral movement towards the interior of the tube.

These FIGS. 3 and 4 also show the method of action of the weakened zones 4. It can be seen that a tearing force applied to the flange 3 of the end-piece can cause the breaking of one or more of these sectors 4 with controlled rearing, permitting the hook-nose to have the possibility of escaping without completely shearing the protecting end-piece.

An alternative form of the end-piece according to the invention, adapted to the handling of tubular bodies protected by end-pieces from lifting hooks of the plate type is shown in FIGS. 5 to 9. The flange 3 of the end-piece is provided in succession with a substantially flat portion 10 followed by an oblique lip 11 having weakened zones 12 in the form of saw-cuts.

The advantage of these zones 12 is clearly shown in FIG. 6, which illustrates the plate 13 of a lifting-hook engaged in the tubular body 1. It can be seen that the lip 11 has been deformed and applied against the internal wall of the tube which it thus protects against accidental contact with the said plate.

This end-piece may also comprise an external rib 14 (FIG. 7) which tends to oppose local deformation of the lip 11 and helps in bringing back the temporary deformed zone of the flange to its initial position after the handling operation. On the contrary, an annular internal slot 15 (FIG. 8) facilitates the bending of the lip 11, it being possible to use or not use this slot in combination with the external rib 14.

An increase in the distance between the plate of the hook and the internal surface of the tubular body (see FIG. 6) further reduces the risk of accidental contact. This increased distance apart is obtained, as shown in FIG. 9, by an over-thickness 16 of the extremity of the lip 11 of the flange.

For good adhesion of the skirt to the outer wall of the tubular body to be protected, the end-piece has a slight conicity such as shown considerably exaggerated in FIG. 10. In addition, a suitably directed chamfer 17 facilitates the fitting of the end-piece over the tube.

In combination with this conical section, the end-piece may be provided internally with circular goffers 18 (FIG. 11) or longitudinal goffers 19 (FIG. 12). These are profiled ribs of various shapes which improve the grip of the skirt of the end-piece on the periphery of the tube.

This same adhesion may also be facilitated by other means, especially that shown in FIG. 13. The skirt 2 of the end-piece has two circular grooves 20 intended to receive rings or bands 21 of any material, and especially of material which shrinks under heat. After placing the end-piece in position, the bands are tightened by any known means, and in the case of a retractable material, by bringing these latter to a good temperature, their shrinkage then ensuring the clamping action of the skirt 2 on the tube 1.

This same process may furthermore be applied to the entire skirt of the end-piece which is then constituted by two superimposed cylinders, of which the internal or external cylinder has heat-retractable properties, the heating of these internal or external casings and the clamping action on the tube which results also causing contraction of the other external or internal casing and ensures the good adhesion of the whole assembly.

The edge 22 of the end-piece may, depending on the applications considered, be broken as shown in FIGS. 17 or 18 or rounded, as shown in FIGS. 15 and 16. In this case, in addition to the above-mentioned over-thickness, which ensures at the same time the protection of the tube chamfer, there may be provided a profiled ring 23 embedded in this over-thickness.

These rings 23 may be of metal or of any synthetic material. Their profile, of which FIGS. 15 to 18 give a few non-limitative examples, is adapted to the type of tube to be protected, and especially to its weight, its coating, to the force which may possibly be applied to the fange of the end-piece during handling operations. Certain excrescences or transverse passages of this profile may improve the anchorage of the ring to the body of the over-thickness.

The normal removal of the end-piece is effected by means of devices such as shown in FIGS. 20 to 24. A ring 24 arranged either inside the tube (FIG. 21) or outside the tube (FIG. 20), depending on the method of storage, is associated with a fine wire 25 embedded in the end-piece but close to the internal face or with a tongue 26. The wire and the tongue follow a predetermined elongated path (FIGS. 20 and 21) or a direct path (FIG. 22), so that at the end of the travel, the end-piece is cut transversely and can easily be removed.

The wire causes a shearing of the material by simple tractive force, while the tongue comprises an incipient fracture over its whole length. FIGS. 23 and 24 show in cross-section the position of the wire and the tongue, the arrow indicating the direction of the force applied in order to obtain the break.

The tube shown in FIG. 19 is capped by an endpiece having a chamfer 27 of opposite sense to that of the end-piece of FIGS. 3 and 4. This type of chamfer, forming a rising slope, is advantageously utilised for putting a tube in position by longitudinal translation on one or a number of tubes stored in a pile in a depot.

Identification of the tubes according to their utilization characteristics is simply effected, as shown in FIG. 12, by an appendage 28 of metal or a synthetic material, added on or formed integrally during manufacture, on the face of which, visible through the tube orifice, the necessary technical data are marked. A colour code may be employed in combination with letter or number references. In the case where the tube comprises a return 8 such as shown in FIG. 3, the flank of the return may be used as a support for these data.

A third alternative form of the end-piece according to the invention is shown in FIG. 25. The flange has the form of a frontal disc 29, constituting with the cylindrical skirt 2 and end-piece which closes the tubular body 1. An internal lug 30 on the disc permits the attachment, either by means of a transverse passage 31 or by a suitable shape of this lug, of casings or small bags 32 containing chemical protection products, especially of the dehydrating agent type. This alternative form may be provided with embedded inserts and tearing wires or tongues, and also, if so desired, with previously weakened zones, as described above.

In the terinal section, the outer surface of the tubular element includes in succession a cylindrical zone A, a frusto-conical zone C forming the chamfer defined by two circular edges D and F and finally a flat annular zone B of variable width.

The end-piece cooperates at least with these three zones for their protection and includes facing zones A, C and B of the tubular element, a skirt G, a flange H (only partially shown) and an interconnecting zone I. Along zone A, the thickness e of the skirt G is substantially constant and equal to the distance between its inner face contacting the outer surface A of the tubular body and its outer surface measured perpendicular to the longitudinal axis of the tubular element; along zone C, in engagement with a variable-length portion of flange H, the thickness of the end-piece has the same constant value e measured parallel to the axis common to the tubular element and the end-piece between the inner and outer faces of the corresponding flange portion.

In the frusto-conical zone C, the inner surface of the interconnecting zone I mates with the chamfer of the tubular element between the circular edges D and F along a path oblique to the axis of the tubular element whereas its outer surface remains parallel to the axis along a certain length then in a rounded zone J turns 90° towards the axis and perpendicular thereto, so that the distance to the annular zone B is substantially equal to said thickness e.

Measured perpendicular to the frusto-conical zone C, the thickness of the end-piece in the interconnecting zone I goes, starting at the edge D -from a value $e_1$ greater than e- to a maximum E in the rounded zone I, back to a value in the vicinity of $e_1$ at the terminal edge F of the chamfer.

It will be noted that the thicknesses of both the skirt G and the flange H are substantially the same, the skirt thus being sufficiently protective without an excessive amount of material. The flange also provides an appropriate protective function being locally torn in case of a pull out force being produced rather than exerting a great resistance and transmitting it to the whole end-piece body which would lead to its complete tearing off; the over-thickness of maximal value E mating with the chamfer zone C provides the dual action of enhancing the static protection of the chamfer against shocks building in a dynamic annular stiffening means for stopping tears which might be started at the flange.

In the embodiment illustrated in FIG. 7, the rounded zone J is replaced by a frusto-conical zone K substantially parallel to the zone C and defined by the circular edges L and M. In this case, the thickness of this portion, measured perpendicular to the zones C and K, goes from a value $e_1$ to a maximum $E_1$ which remains constant between the edges L and M and than back to the value $e_1$.

The end-pieces forming the object of the invention can be economically produced by moulding, extrusion or rotation, permitting the production of multi-purpose tools and models, that is to say the same tooling may serve to manufacture elements of variable thickness, or the same model of end-piece will be suitable for protecting tubular bodies of different thicknesses.

It will be understood that the present invention is not limited to the forms of embodiment described and shown but includes all combinations of various parts describes and shown and all alternative forms of construction.

What I claim is:

1. A one-piece protective end piece for tubular elements having chamfers at their ends, comprising in succession a generally cylindrical peripheral skirt adapted to fit onto an outer wall of a said tubular element, a corner portion of extra thickness acting as a stiffening zone with an inclined inner annular surface adapted to accommodate the chamfer on the tubular element, a resilient frusto-conical flange member extending inwardly of the portion of extra thickness, said resilient flange member being adapted to be normally out of contact with an inner wall of the tubular element and inclined relative thereto but being adapted to be brought into contact with the inner wall of the tubular element when gripped by a lifting or handling hook for lifting or handling operations, and means in said flange member for enabling local deformation of said flange member when it is gripped by a lifting or handling hook so that only part of said flange member is brought into contact with the inner wall of the tubular element.

2. A protective end piece according to claim 1, wherein said means comprises slits disposed at spaced intervals around said flange member and inclined at the same angle as said flange member.

3. A protective end piece according to claim 2, wherein said flange member has a free circular inner edge and said slits open through said edge.

4. A protective end piece according to claim 1, wherein said flange member includes a portion extending substantially radially immediately adjacent to said portion of extra thickness.

5. A protective end piece according to claim 4, wherein the thickness of said portion of extra thickness measured perpendicular to the chamfer is substantially greater than the thickness of said skirt and the thickness of said flange member which are substantially equal to each other.

6. A protective end piece according to claim 1, wherein said flange member has a free circular inner edge.

* * * * *